UNITED STATES PATENT OFFICE.

HARRY O. CHUTE, OF CLEVELAND, OHIO.

SOLVENT AND PROCESS OF PREPARING SAME.

No. 845,616.　　　Specification of Letters Patent.　　　Patented Feb. 26, 1907.

Application filed January 14, 1907. Serial No. 352,268.

*To all whom it may concern:*

Be it known that I, HARRY O. CHUTE, a citizen of the United States, residing in Cleveland, in the county of Cuyahoga and State of Ohio, have invented certain new and useful Improvements in Solvents and Processes of Preparing the Same; and I do hereby declare the following to be a full, clear, and exact description of the same, such as will enable others skilled in the art to make and use the same.

This invention relates to solvents and processes of preparing the same, and consists in an acetic ester protected against hydrolysis by the presence of another solvent and in a method of producing such a compound solvent, all as more fully hereinafter set forth and as claimed.

The acetic esters of the aliphatic and other alcohols are excellent solvents for resins, and particularly for the resins accompanying the rubber gums in crude rubber, but suffer from the disadvantage of comparative instability in the presence of water, especially when heated, as they tend to break up to a slight extent by assumption of a molecule of water and reformation of acetic acid and the alcohol from which the ester is derived. While this decomposition is seldom far-reaching, only a small amount occurring with any moderate amount of water in a moderate length of time, it is nevertheless sufficient to render the use of such esters unduly costly for the purpose of extracting the resins from crude rubber, an operation to which they are otherwise well adapted. The crude rubber always carries more or less moisture, which of course mixes with the solvent in extracting resin and must afterward be removed to fit the solvent for further use. In this removal the most suitable way is fractional distillation; but this involves heating the ester and water together and in consequence more or less of the stated hydrolytic decomposition. I have discovered that by mixing these esters with solvents less sensitive to water this tendency to dissociation or hydrolysis may be obviated and that the mixtures so formed are well adapted both for removing resins from crude rubber and for miscellaneous purposes. As the second solvent I prefer a ketone, and more particularly acetone, the ketones being, like the lower acetic esters, soluble in water and good resin solvents. Besides the true acetone or dimethyl ketone there is a body known in commerce as "methyl acetone," which while quite similar in most of its characteristics in others is distinctly different. The true acetone is customarily prepared by pyrolytic decomposition of acetates or acetic acid, while the methyl acetone is a low-boiling fraction of wood-spirit. Though the true acetone may be used for my purposes, I prefer the methyl acetone when preparing a low-boiling solvent.

As the acetic ester I prefer the methyl compound. Methyl acetate in admixture with either acetone or methyl acetone forms a very desirable solvent both for removing rubber resins and for general use as a solvent. The boiling-points of methyl acetate and acetone lie very close together, there being but about three degrees difference, and the mixture can therefore be easily fractionated away from water and other bodies as a whole. The same is true of a mixture of methyl acetate and methyl acetone, and this mixture offers certain advantages as a solvent over the mixture just stated. Methyl acetone may also be used in admixture with other acetic esters, such as ethyl acetate. Other and higher boiling ketones, such as methyl-propyl ketone, may be used in conjunction with acetic esters when higher-boiling mixtures are desired.

A mixture of methyl acetate and methyl acetone I find to be practically insensitive to the hydrolytic action of water, and it may be used for extracting crude rubber and separated from the resin and water extracted by boiling off substantially without practical loss, so that it may be repeatedly reused. A mixture of about equal quantities of the two solvents dissolves some twenty per cent. of resin, such as the resin from crude pontianak rubber.

Methyl acetate may be protected from hydrolysis by other solvents—as, for instance, by the use of methyl alcohol. The described hydrolysis, in the presence of a given quantity of water, goes on till a certain balance obtains between the undecomposed acetic ester and its hydrolytic products—methyl alcohol and acetic acid in the case of methyl acetate. This balance may as well be obtained by the use of one of these products as of both, or, in other words, if methyl alcohol be already present in sufficient amount hydrolysis may be restrained altogether. About ten per cent. of methyl alcohol in admixture with methyl acetate in practice proves sufficient, though more may be used.

Use of the described compound solvents for extracting crude rubber forms the subject of a copending application, Serial No. 351,868, filed January 11, 1907.

A very advantageous, cheap, simple, and ready method of forming my preferred composition of methyl acetate and methyl acetone consists in directly converting the methyl alcohol of ordinary commercial wood-spirit into methyl acetate, using any suitable acetate and acid for this purpose. The methyl acetone in the wood-spirit is not affected by this operation, and remains in admixture with the methyl acetate formed. Ordinary wood-spirit usually contains about thirty per cent. of methyl acetone. I, however, usually prefer a greater proportion of methyl acetone in my compound solvent than is given by this simple method, though any proportion is useful. A good method of obtaining a solvent with higher amounts of methyl acetone is to fractionate the crude alcohol in a column-still rectifying apparatus, cutting out and reserving the first portions, which boil around 56° centigrade. The remaining portion, which is freed from the bulk of the methyl acetone, can be withdrawn from the still and used directly, but I prefer to distil it also, cool, and manufacture into the methyl acetate. This may easily be done in the following manner: In a covered iron vessel I place two hundred and ten pounds of 66° Baumé commercial sulfuric acid. Into this, through a small lead pipe or other suitable means, I carefully and slowly pass nineteen gallons of the purified wood-alchol, obtained as just described. It is best introduced at the bottom of the body of acid, taking care not to allow the mixture to become hot enough to evolve methyl ether. After the mixture is made and has become sufficiently cool it is poured over three hundred and four pounds of ordinary commercial gray acetate of lime. This is best done in a retort with a stirrer or other convenient form of covered vessel. The mixture is heated and stirred till all volatile bodies are removed, suitable condensing means being used to recover them. From the condenser will flow about thirty-seven gallons of methyl acetate of sufficient purity for most purposes. It may be rectified, but this ordinarily not necessary. To this methyl acetate I add about an equal volume of the methyl acetone prepared in the preliminary distillation of the wood-spirit. The mixture may be rectified, if desired.

A solvent containing less methyl-acetone, but sufficient for protective action for most purposes, may be prepared by substituting for the nineteen gallons of purified alcohol stated above twenty-five gallons of ordinary ninety-five-per-cent. alcohol as made in the ordinary retort charcoal process. This contains about thirty per cent. methyl acetone, which goes through the process and finally remains in admixture with the methyl acetate produced. The operation gives about forty-three gallons of solvent containing about fifteen per cent. of methyl acetone.

The pure methyl acetone, as recovered from wood-spirit, has about the same boiling-point—namely, around 56.5°—as the true acetone from acetates, but yields only about half as much chloroform on chlorinating in the usual way as does the true acetone. The structural differences of the two substances are unknown.

What I claim is—

1. As a new composition of matter, a compound solvent comprising methyl acetate and a protective solvent.

2. As a new composition of matter, a compound solvent comprising methyl acetate and a ketone.

3. As a new composition of matter, a compound solvent comprising methyl acetate and an acetone.

4. As a new composition of matter, a compound solvent comprising methyl acetate and methyl acetone.

5. As a new composition of matter, a compound solvent comprising an acetic ester and methyl acetone.

6. The process of preparing a compound solvent which consists in mixing methyl acetate with a protective solvent.

7. The process of preparing a compound solvent which consists in fractionating wood-spirit, reserving the low-boiling portion, converting the residue into methyl acetate and mixing the methyl acetate with the stated low-boiling fraction in desired proportions.

In testimony whereof I affix my signature in the presence of two witnesses.

HARRY O. CHUTE.

Witnesses:
B. L. CHADWELL,
K. P. MCELROY.